(12) United States Patent
Coleman et al.

(10) Patent No.: US 8,342,690 B2
(45) Date of Patent: Jan. 1, 2013

(54) OFF-STATE LIGHT BAFFLE FOR DIGITAL PROJECTION

(75) Inventors: Jesse J. Coleman, Caledonia, NY (US); James Mazzarella, Fairport, NY (US); James R. Kircher, Mendon, NY (US)

(73) Assignee: Eastman Kodak Company, Rochester, NY (US)

( * ) Notice: Subject to any disclaimer, the term of this patent is extended or adjusted under 35 U.S.C. 154(b) by 289 days.

(21) Appl. No.: 12/770,081

(22) Filed: Apr. 29, 2010

(65) Prior Publication Data
US 2011/0267550 A1  Nov. 3, 2011

(51) Int. Cl.
*G03B 21/26* (2006.01)
(52) U.S. Cl. .......................................... 353/34; 165/185
(58) Field of Classification Search .................. 353/31, 353/34; 359/614, 833; 165/181, 185; 348/759
See application file for complete search history.

(56) References Cited

U.S. PATENT DOCUMENTS

| 4,441,791 | A | | 4/1984 | Hornbeck |
| 4,785,875 | A | * | 11/1988 | Meijer et al. ............. 165/104.25 |
| 4,823,869 | A | * | 4/1989 | Arnold et al. ................. 165/185 |
| 5,535,047 | A | | 7/1996 | Hornbeck |
| 5,600,383 | A | | 2/1997 | Hornbeck |
| 6,109,767 | A | | 8/2000 | Rodriguez |
| 6,606,195 | B2 | * | 8/2003 | Tsuji ............................. 359/566 |
| 6,751,027 | B2 | | 6/2004 | Van Den Bossche et al. |
| 7,128,429 | B2 | | 10/2006 | Tausch |
| 7,207,678 | B2 | | 4/2007 | Penn |
| 7,959,305 | B2 | * | 6/2011 | Destain ........................... 353/99 |
| 2003/0079860 | A1 | * | 5/2003 | Hoffmann et al. ........... 165/80.3 |
| 2006/0044521 | A1 | * | 3/2006 | Vandorpe et al. ............... 353/33 |
| 2008/0018553 | A1 | * | 1/2008 | Umamine et al. ............. 345/1.3 |

* cited by examiner

*Primary Examiner* — Que T Le
*Assistant Examiner* — Jerry Brooks
(74) *Attorney, Agent, or Firm* — Kevin E. Spaulding

(57) ABSTRACT

A light modulation assembly for a digital projection apparatus comprising: a solid-state light source that provides an illumination beam; a spatial light modulator having a plurality of tiltable micro-mirrors, each micro-mirror being actuable to tilt with respect to a tilt axis between a first tilt position that provides on-state light and a second tilt position that provides off state light, and wherein the micro-mirrors deflect the illumination beam along an arced path defining a deflection plane as they are tilted between the first tilt position and the second tilt position; and a light baffle disposed alongside the optical axis and in the path of the off state light from the micro-mirrors, the light baffle having a light-trapping surface adapted to absorb the off-state light from the micro-mirrors on the spatial light modulator, the light-trapping surface having a plurality of protruding fins that extend outward from the light-trapping surface at an oblique angle.

16 Claims, 8 Drawing Sheets

OFF-STATE LIGHT BAFFLE FOR DIGITAL PROJECTION

FIELD OF THE INVENTION

This invention relates to an apparatus for forming and projecting digital images and more particularly to an improved apparatus and method for absorbing unused off-state light that is discarded from the light modulators, together with the accompanying heat that is generated by light absorption.

BACKGROUND OF THE INVENTION

In order to compete with conventional high-end film-based projection systems and provide what has been termed electronic or digital cinema, digital projectors must be capable of achieving brightness levels on the order of 10,000 lumens, projected onto screen sizes on the order of 40 feet in diagonal. The range of screens requires anywhere from 5,000 lumens to upwards of 40,000 lumens. In addition to this demanding brightness requirement, these projectors must also deliver high resolution (at least 2048×1080 pixels) and provide around a 2000:1 contrast ratio and a wide color gamut.

Some commercialized digital cinema projector designs have proved to be capable of this level of performance. However, there are still significant hurdles in usability and cost that must be overcome for widespread adoption of digital cinema systems. Digital projection apparatuses that meet the necessary performance requirements typically cost in excess of $50,000 each and utilize high wattage Xenon arc lamps that need replacement at intervals between 500-2000 hours, with typical lamp replacement cost often exceeding $1000.

One type of spatial light modulator (SLM) that is being widely utilized in projection solutions for multicolor digital cinema projection is the Digital Light Processor (DLP), a digital micromirror device (DMD), developed by Texas Instruments, Inc., Dallas, Tex. DLP-based projectors have demonstrated the capability to provide the necessary light throughput, contrast ratio, and color gamut for most projection applications from desktop to large cinema venues. DLP devices are described in a number of patents, for example U.S. Pat. No. 4,441,791; U.S. Pat. No. 5,535,047 and U.S. Pat. No. 5,600,383, all to Hornbeck. Significantly, DLP devices can be used with solid-state light sources, such as lasers. Lasers are known to be advantaged over other types of light sources with regard to relative spectral purity and potentially high brightness levels. Solid-state lasers promise improvements in etendue, longevity, and overall spectral and brightness stability. The use of lasers can significantly reduce the cost of the illumination system and, at the same time, offer increased color gamut and sufficient brightness levels compatible with digital cinema applications. Laser arrays of particular interest for projection applications include various types of VCSEL arrays, including VECSEL (Vertical Extended Cavity Surface-Emitting Laser) and NECSEL (Novalux Extended Cavity Surface-Emitting Laser) devices from Arasor, Sunnyvale, Calif.

Among problems that must be addressed when using laser illumination with DLP and other micromechanical devices are the generation of unused off-state or "dump" light and the corresponding heat generation that results from attempts to absorb the unused dump light. Off-state or dump light is an inevitable by-product of the DLP modulation scheme. In order to understand how off-state light is generated, it is first useful to trace the path of modulated light. Referring to the schematic diagram of FIG. 1, a projector apparatus 10 has Red, Green, and Blue light modulation assemblies 40r, 40g, 40b, each with a corresponding light source 12r, 12g and 12b, respectively. Light source 12r has a red laser or other low angle (f/6 or higher) solid-state red light source; light source 12g has a green laser or other low angle solid-state green light source; light source 12b has a blue laser or other low angle solid-state blue light source. The light path within each light modulation assembly 40r, 40g and 40b follows the same basic pattern. An illumination beam from light source 12r, 12g or 12b is directed through a lens 50, an integrator 51, and other conditioning optics onto a thin-film dichroic surface 68. Dichroic surface 68 is treated to reflect or transmit incident light according to its incident angle. Incident illumination is reflected from the dichroic surface 68 onto a micro-mirror spatial light modulator 60, such as a DLP device, that reflects modulated light back through dichroic surface 68 and to a dichroic combiner 82. The dichroic combiner 82 has an arrangement of dichroic surfaces 84 that selectively reflect or transmit light according to wavelength, combining the modulated light from each light modulation assembly 40r, 40g and 40b onto a single optical path through projection optics 70, which project images of the spatial light modulators 60 onto a projection surface (not shown).

For a projector arrangement such as projector apparatus 10 in FIG. 1, off-state or dump light is the unused light that is deflected such that it is not reflected along the path of modulated light for projection onto the projection surface. The schematic side-view diagram of FIG. 2 shows how light is redirected by a micro-minor 66 in the DLP spatial light modulator 60 for any of the red, green or blue color channels. An incoming laser illumination beam 18 is incident on the surface of spatial light modulator 60. The micro-mirrors 66 are tiltable in response to digital image data for an input digital image, each micro-mirror 66 being actuable to tilt with respect to a tilt axis between a first tilt position 64 and a second tilt position 65. In the first tilt position 64 the micro-mirror 66 deflects the illumination beam 18 to provide on-state modulated light 22 along an optical axis O. In the second tilt position 65, the illumination beam 18 is directed away from the optical axis O to provide the off-state dump light 23. The micro-mirrors 66 deflect the illumination beam 18 along an arced path Q defining a deflection plane 67 as they are tilted between the first tilt position 64 and the second tilt position 65.

Once the dump light 23 is generated, it must be contained and absorbed in some way to prevent it from randomly reflecting from a chassis or other surface and inadvertently leaking back into the light path used for modulated light 22. This would degrade image contrast and could also compromise color fidelity and overall image quality. As a related problem, heat is produced when intense light levels, such as those generated by light modulation assemblies 40r, 40g and 40b, are absorbed. This heat must be removed to keep the projector apparatus from overheating. To complicate the problem further, there is some unpredictability as to the amount of dump light 23 that must be handled at any one time, since this depends on the image content and can vary from frame-to-frame in a digital motion picture.

Conventional solutions for absorbing unwanted light and dissipating the heat resulting from absorption use arrangements of baffles that may be coupled with heat sink devices, further supplemented by forced air cooling in some cases. Some approaches to the problem have also attempted to combine light- and heat-absorption functions in a single component. For example, U.S. Pat. No. 6,109,767 to Rodriguez, entitled "Honeycomb light and heat trap for projector," combines the functions of light-trapping and heat dissipation for an overhead projector by employing a coated honeycomb element in the ventilation path. U.S. Pat. No. 7,128,429 to Tausch, entitled "Light trap and heat transfer apparatus and method," describes the use of a metallic wool material for absorbing unwanted light and heat in a curing lamp apparatus.

These approaches have been found to not provide the level of performance that is needed for the high-intensity laser light associated with a digital cinema projector. One particular problem that has not been addressed relates to the pattern of movement of the beams generated by the micro-mirror spatial light modulators 60. During the transition time interval where the micro-mirror 66 pivots between the first tilt position 64 providing the modulated light 22 and the second tilt position 65 providing the dump light 23, the reflected light traces out the arced path Q. While this transition time interval during pivoting of the micromirror is very small, on the order of fractions of milliseconds, the cumulative effect of sweeping the off state light across the arced path complicates the task of suppressing the unwanted light and resulting heat that is generated.

Thus, it can be seen that there remains a need for a solution that effectively removes the off-state light and associated heat generated in high-end digital projection systems in a simple, cost-effective manner.

SUMMARY OF THE INVENTION

It is an object of the present invention to address the need for removing off-state light from the optical path of a projection apparatus and for removing heat that is generated by the off-state light. With this object in mind, the present invention provides a light modulation assembly for a digital projection apparatus comprising:

a solid-state light source that provides an illumination beam;

a spatial light modulator disposed in the path of the illumination beam, the spatial light modulator having a plurality of tiltable micro-minors, each micro-minor being actuable to tilt with respect to a tilt axis between a first tilt position that provides on-state light and a second tilt position that provides off-state light, wherein the micro-mirrors deflect the illumination beam along an optical axis to provide the on-state light when they are at the first tilt position, and the micro-mirrors deflect the illumination beam away from the optical axis to provide the off-state light when they are at the second tilt position, and wherein the micro-mirrors deflect the illumination beam along an arced path defining a deflection plane as they are tilted between the first tilt position and the second tilt position; and a light baffle disposed alongside the optical axis and in the path of the off-state light from the micro-mirrors, the light baffle having a light-trapping surface adapted to absorb the off-state light from the micro-minors on the spatial light modulator, the light-trapping surface having a plurality of channels extending in a lengthwise direction, wherein each channel is defined by protruding fins that extend outward from the light-trapping surface at an oblique angle with respect to the deflection plane, the lengthwise direction of the channels being substantially parallel to the deflection plane.

It is a feature of the present invention that it employs a baffle that has features oriented to the pattern of the off-state light produced by the spatial light modulator.

It is an advantage of the present invention that it provides a baffle that reduces unwanted reflection of the off-state dump light over the transition path of the micromirror light modulators.

These and other objects, features, and advantages of the present invention will become apparent to those skilled in the art upon a reading of the following detailed description when taken in conjunction with the drawings wherein there is shown and described an illustrative embodiment of the invention.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figures shown and described herein are provided to illustrate principles of operation according to the present invention and are not drawn with intent to show actual size or scale. Because of the relative dimensions of the component parts for the laser array of the present invention, some exaggeration is necessary in order to emphasize basic structure, shape and principles of operation.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

The terms "off-state light" and "dump light" are considered to be synonymous in the context of the present disclosure. The terms "on-state light" and "modulated light" and "imaging light" are considered to be synonymous in the context of the present disclosure.

Positional terms such as "top", "bottom", "sides", "front", "rear", and the like are used to help provide reference points for explaining the operation of components as presented in the various figures of the present application; such terms to not necessarily imply that a component or group of components must have a particular orientation when used in a projection apparatus.

Embodiments of the present invention address the need for removing off-state or dump light from each color channel in a projection apparatus by using a light baffle having a light-trapping surface with light-absorbing features that are arranged to trap the off-state light and prevent its reflection while absorbing the resulting heat energy that is generated. The shape and angular orientation of the light-absorbing features of the light baffle are significant and are designed such that the off-state light undergoes multiple reflections before it can exit the light baffle, thus increasing the probability that the off-state light is absorbed.

Figure 1:
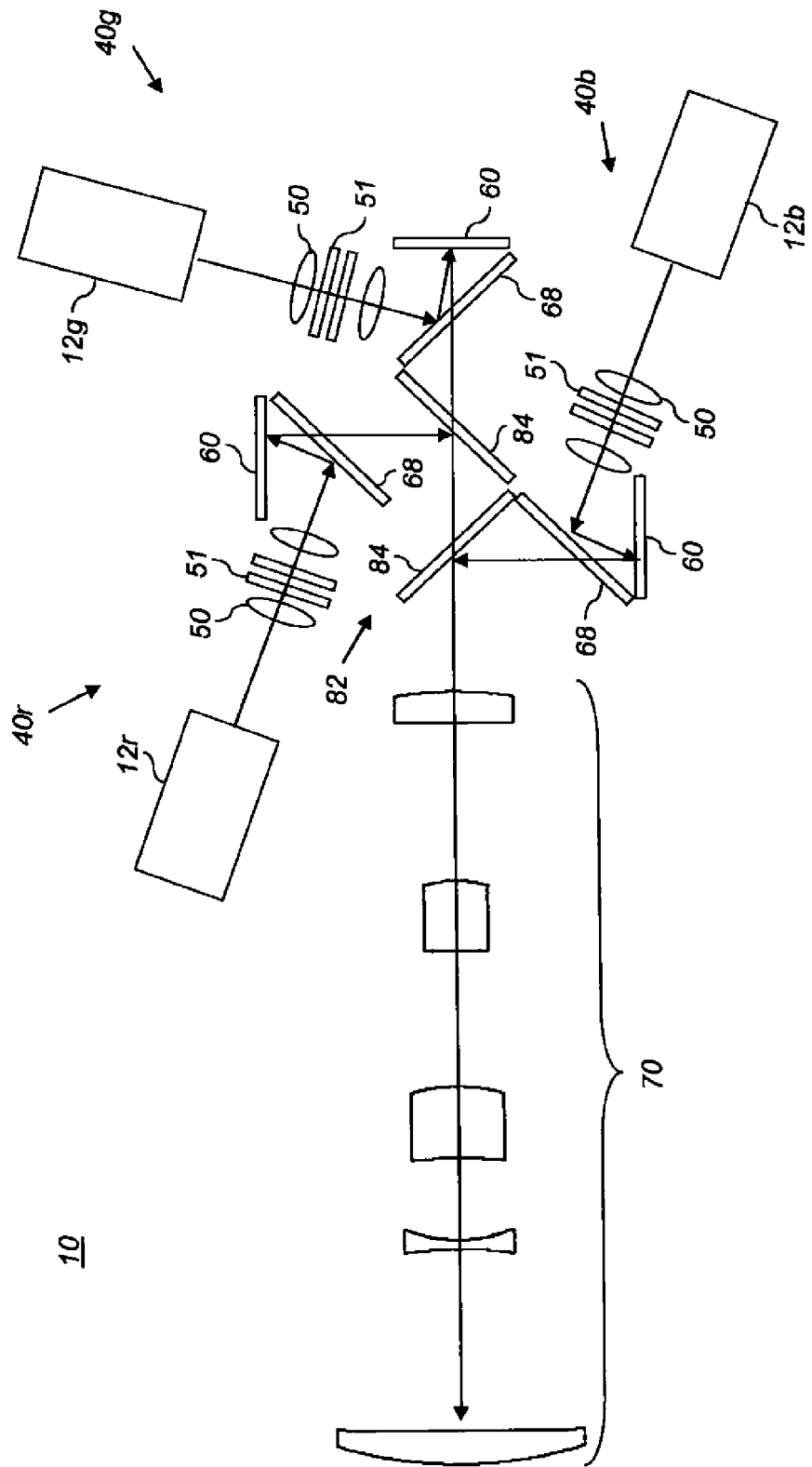
FIG. 1 is a schematic block diagram showing the general arrangement of a projection apparatus according to one embodiment of the present invention, showing the path of modulated light.
Figure 2:
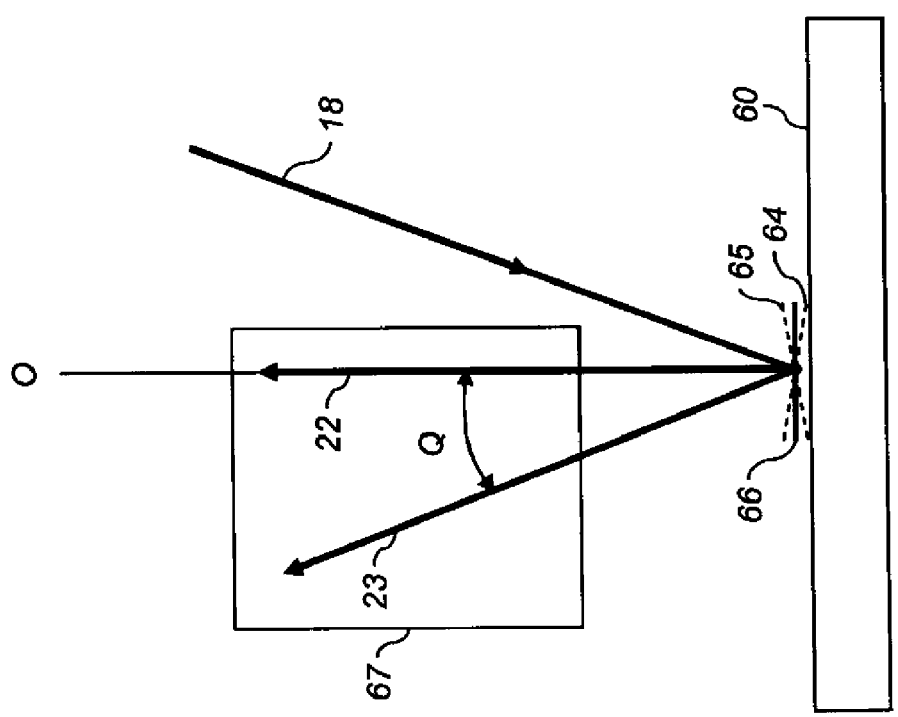
FIG. 2 is a schematic diagram showing the path of on-state modulated light and off-state dump light from a digital micromirror spatial light modulator.
Figure 3:
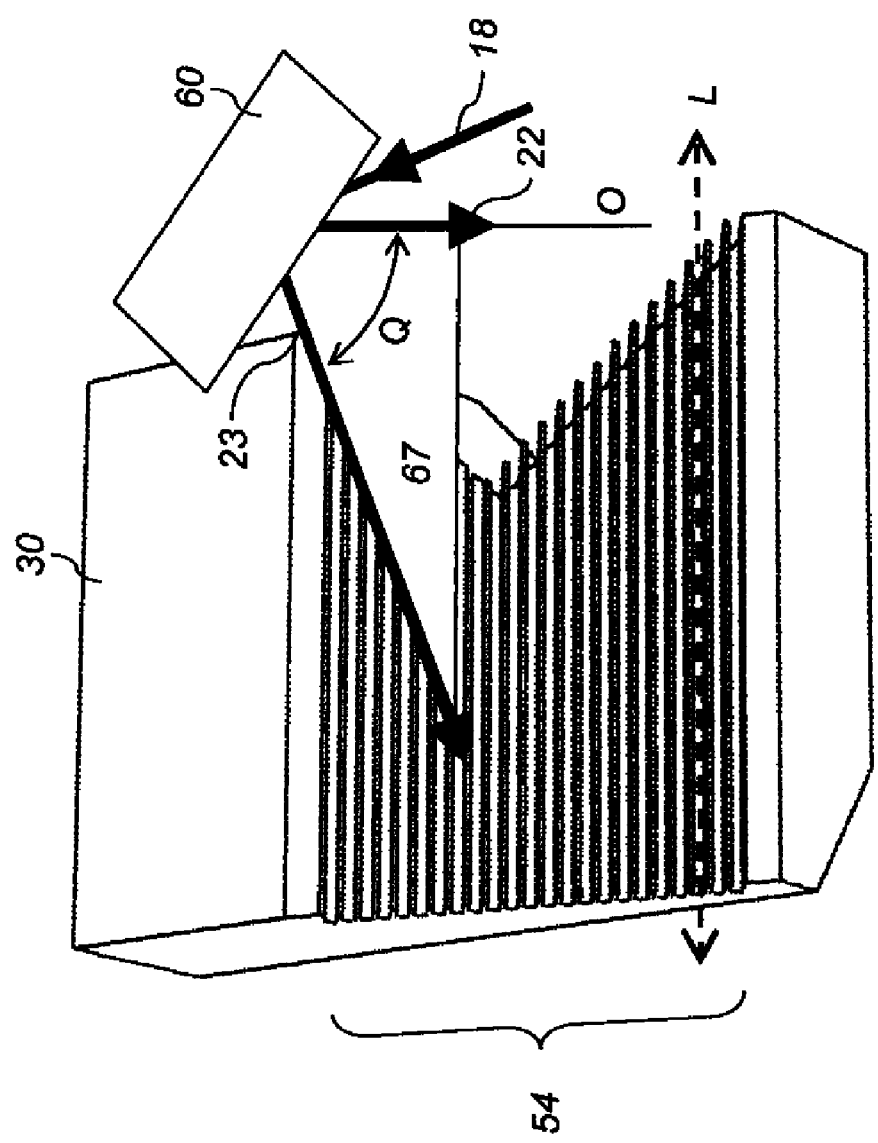
FIG. 3 is a perspective view showing a light baffle according to one embodiment of the present invention in relationship to on-state modulated light and off-state dump light from a spatial light modulator.

FIG. 3 illustrates a light baffle 30 according to one embodiment of the present invention. The light baffle 30 is positioned in relationship to spatial light modulator 60, which includes micro-mirrors 66 (FIG. 2) that deflect the illumination beam 18 to provide either on-state modulated light 22 directed along optical axis O or off-state dump light 23. In particular, the light baffle 30 is disposed alongside the optical axis O so as to not interfere with the on-state modulated light 22, and is positioned in the path of the off-state dump light 23. The light baffle 30 has a light-trapping surface 54 having a plurality of light-absorbing features, extending in a lengthwise direction L, adapted to trap the off-state dump light 23. The lengthwise direction L is substantially parallel to the deflection plane 67 defined by the arced path Q traced out by the deflected light beam in the transition time between the on-state modulated light 22 position and the off-state dump light 23 position.

Figure 4:
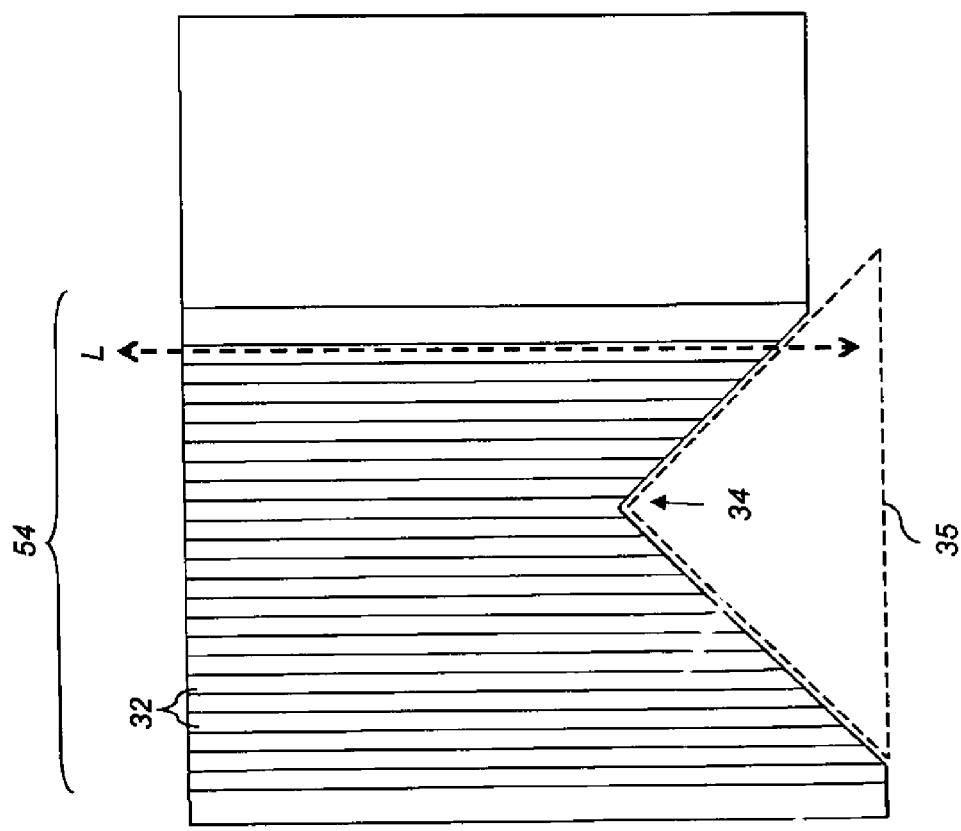
FIG. 4 is a top view of the light baffle shown in FIG. 3.
Figure 5:
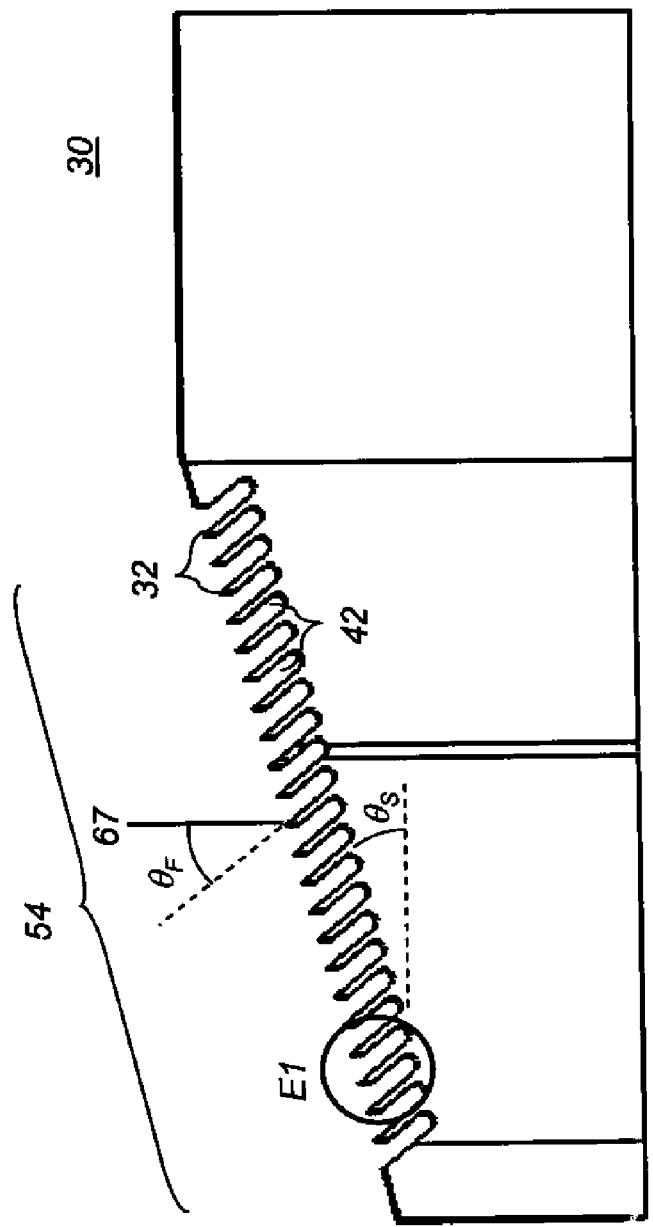
FIG. 5 is a side view of the light baffle shown in FIG. 3.

FIGS. 4 and 5 illustrate top and side views, respectively, of the light baffle 30 shown in FIG. 3. These views more clearly illustrate various features of the light baffle 30. In a preferred embodiment, the light baffle 30 includes a notch 34 as shown in FIG. 4. The notch 34 is adapted to allow the on-state modulated light 22 to be unobstructed as it is directed along the optical axis O, while maximizing the amount of light that is trapped by the light-trapping surface 54 during the transition time when the micro-mirrors 66 (FIG. 2) are sweeping the deflected light as they tilt between the first tilt position 64 (FIG. 2) and the second tilt position 65 (FIG. 2). The shape of the notch 34 can be determined by tracing the path of the on-state modulated light 22 for each micro-mirror in the spatial light modulator 60 to define a notch area 35 where the light baffle 30 should be notched out. Since most common DLP spatial light modulators 60 use micro-mirrors having a 45 degree tilt axis, the deflection plane will be oriented at 45 degrees relative to the sides of the spatial light modulator 60. Consequently, the notch area 35 will correspond roughly to a 45-45-90° triangular region.

In a preferred embodiment, the light-trapping surface 54 is sloped at a slope angle $\theta_S$ and includes a plurality of channels 42 extending in the lengthwise direction L, wherein each channel 42 is defined by protruding fins 32 that extend outward from the light-trapping surface 54 at an oblique fin angle $\theta_F$ with respect to the deflection plane 67, the lengthwise direction L of the channels being substantially parallel to the deflection plane 67. The fin angle $\theta_F$, the slope angle $\theta_S$, the channel width (fin spacing) and the fin thickness are design parameters that can be selected to ensure that the off-state dump light 23 is directed down into the channels 42 where the large majority of the light will be absorbed as it undergoes multiple reflections before it can escape from the channels 42. Preferably, the fin angle $\theta_F$ should be less than about 60 degrees to produce practical fin designs.

The fins 32 and the channels 42 of the light-trapping surface 54 are preferably coated or otherwise treated to help minimize reflectivity. In one embodiment, the light baffle 30 is fabricated from a metal such as aluminum and an anodizing treatment is provided for the light-trapping surface 54. In other embodiments, the light-trapping surface 54 can be coated with a black paint or some other light absorbing substance, or the light-trapping surface 54 can itself be fabricated using a light absorbing material. Preferably, the reflectivity of the light-trapping surface 54 should be less than about one percent in order to absorb a large fraction of the light upon each reflection.

The fact that lengthwise direction L is substantially parallel to the deflection plane 67 is significant. This characteristic ensures that there will be approximately equivalent absorption of the off-state light along the entire arced path Q traced out by the deflected light beam. This result is obtained because the light beam scans down the length of the fins 32 maintaining approximately the same angle of incidence with the sides of the fins 32. If the lengthwise direction L of the fins 32 is oriented cross-ways to the deflection plane 67, it has been found that the amount of absorption can vary significantly as a function of the location that the deflected light beam is incident on the light-trapping surface 54.

Figure 6B:
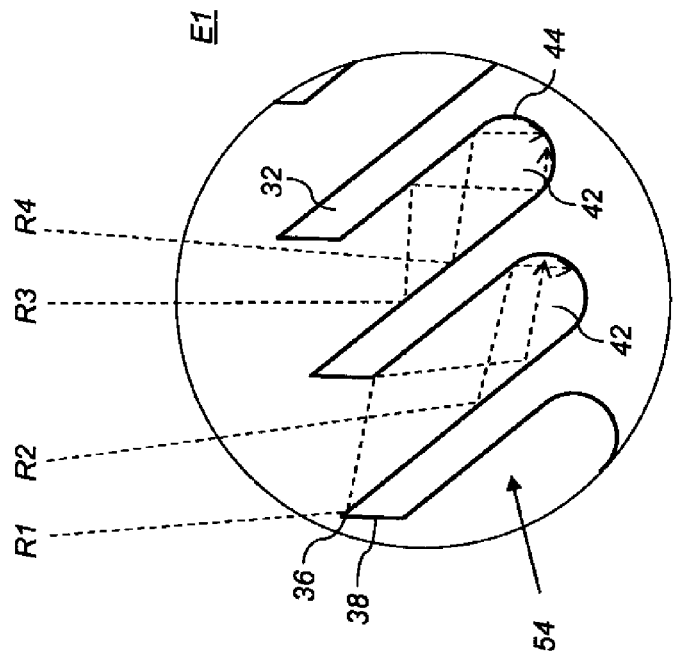
FIG. 6B is an enlarged side view of the light baffle shown in FIG. 3 showing handling of off-state dump light by the light-absorbing fin structure.
Figure 6A:
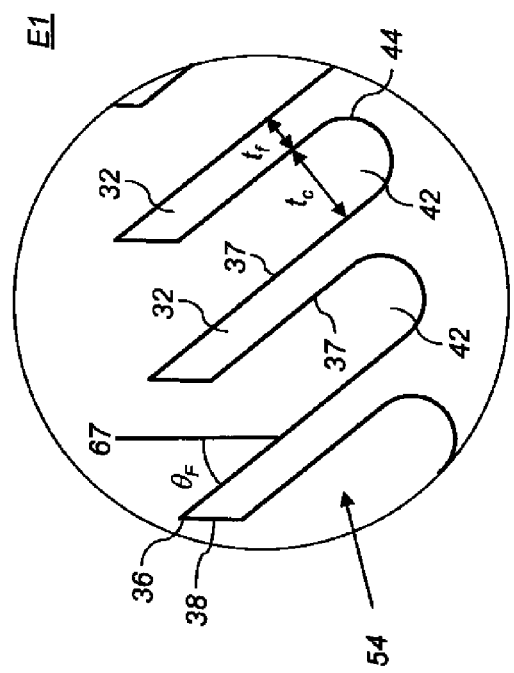
FIG. 6A is an enlarged side view of the light baffle shown in FIG. 3 showing details of the light-absorbing fin structure according to one embodiment.

FIG. 6A shows an enlarged section E1 from FIG. 5, showing additional details for the channels 42 and the fins 32 than are formed into the light-trapping surface 54 according to a preferred embodiment of the present invention. In this embodiment the channels 42 have rounded bottoms 44, and the fins 32 have roughly parallel sides 37, the lower fin side being beveled to provide beveled ends 38 such that the fins 32 are tapered to a knife edge 36. The fins 23 have a channel width (fin spacing) given by $t_c$ and a fin thickness given by $t_f$.

Preferably, the geometry of the light-trapping surface 54 is configured such that the fin tips are "invisible" to the incoming off-state light dump light 23, and also to any light reflected off an adjacent fin. This causes the entire light-trapping surface 54 to appear as a black body absorber to the incident off-state light dump light 23. A configuration using the geometry of FIG. 6A with a fin angle of $\theta_F$=40 degrees and a slope angle of $\theta_S$=20 degrees (i.e., an angle of 70 degrees with respect to the deflection plane 67), together with a fin thickness of $t_f$=0.44 mm and a channel width of $t_c$=1.00 mm has been found to satisfy this condition and achieve the desired results according to one embodiment of the present invention. In this arrangement, all of the off-state dump light 23 incident on the light-trapping surface 54 will first be reflected from an upper fin side, and will be directed across a channel to strike the lower fin side for an adjacent fin, thereby undergoing at least 2 reflections (and generally many more) before it can escape from the light-trapping surface 54. Since the light-trapping surface 54 is preferably treated to be light absorbing, the present invention will ensure that virtually all of the off-state light dump light 23 will be absorbed by the light baffle 30, thereby improving the quality of the projected image by ensuring that none of the off-state light dump light 23 can make its way back into the imaging path.

FIG. 6B shows a number of light rays R1, R2, R3 and R4 incident on the light-trapping surface 54. It can be seen that the shape and orientation of the fins 32 is such that the light rays R1, R2, R3 and R4 are directed down into the channels 42 as they are reflected multiple times from the surface of the fins. Each time the light rays R1, R2, R3 and R4 are reflected, a large fraction of the light is absorbed, so that after only a few reflections there is only a negligible amount of light left that can possibly escape from the light-trapping surface 54. The illumination beam 18 (FIG. 2) that is incident on the spatial light modulator 60 will generally have a cone angle associated with the F/# of the optical components used to direct the light from the light source onto the spatial light modulator. As a result, the light rays R1, R2, R3 and R4 can come in at slightly different angles. Preferably, the fins 32 are shaped and oriented such that each of the light rays from each of the micro-mirrors in the spatial light modulator 60 undergoes at least 2 reflections before exiting the channels.

Figure 7B:
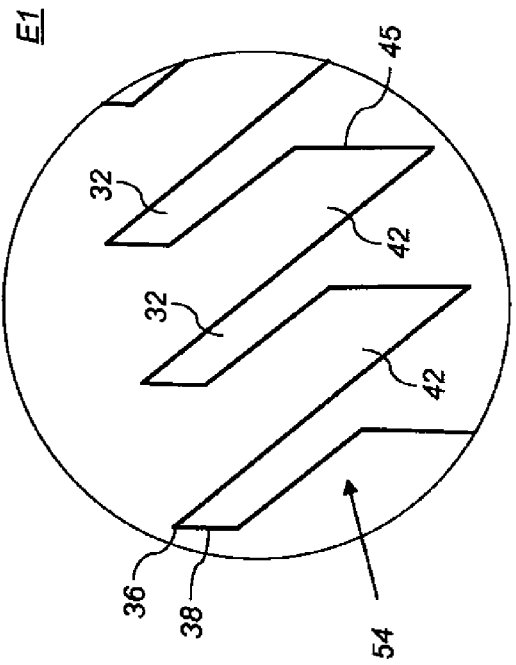
FIGS. 7A and 7B are enlarged side views of a light baffle showing details of alternate light-absorbing fin structure embodiments.
Figure 7A:
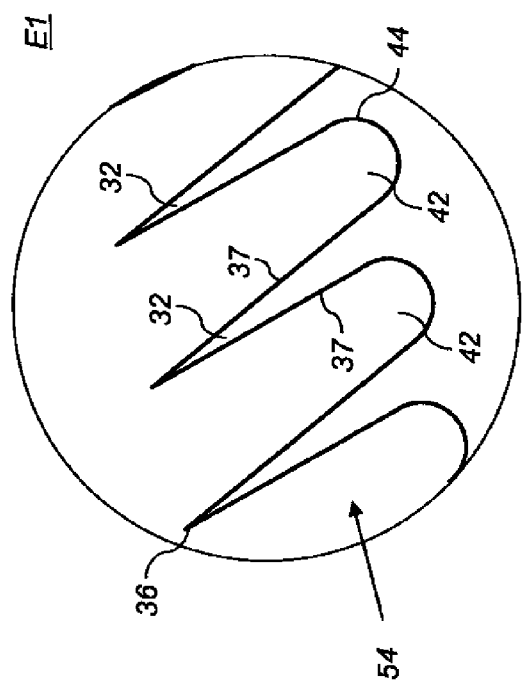

In alternate embodiments, the fins 32 and the bottoms of the channels 42 can have different shapes. For example, FIG. 7A shows fins 32 where the sides 37 are not parallel such that the fins taper to a knife edge 36 without the need to form beveled ends according to one embodiment. Similarly, FIG. 7B shows channels having beveled bottoms 45 according to another embodiment. Those skilled in the art will recognize that many different fin shapes and channel shapes can be used in accordance with the present invention.

Figure 8:
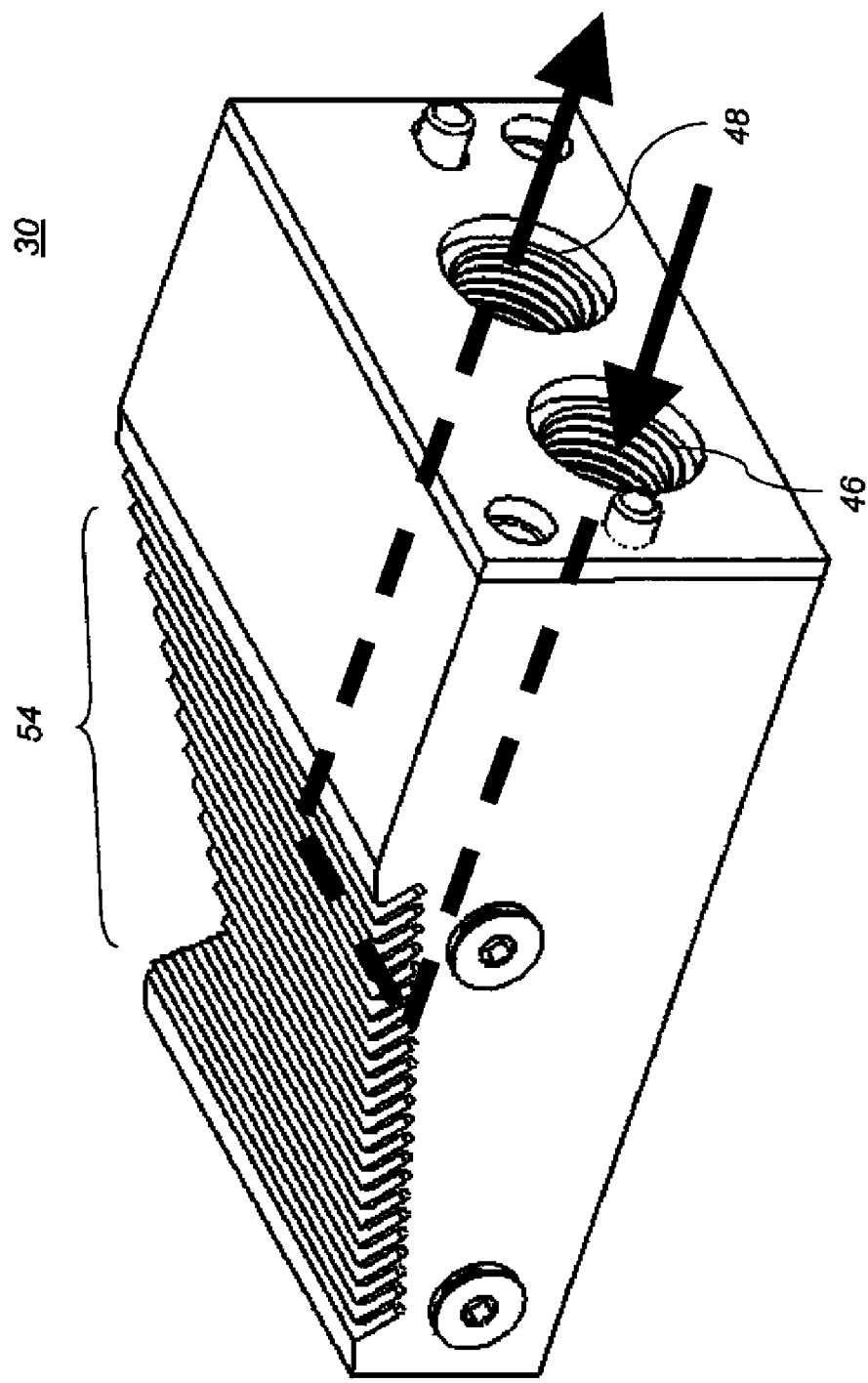
FIG. 8 is a perspective view of the light baffle shown in FIG. 3 showing a liquid coolant conduit for cooling the light baffle according to one embodiment; and It is to be understood that the attached drawings are for purposes of illustrating the concepts of the invention and may not be to scale.

The absorption of the off-state dump light 23 by the light baffle 30 can result in a considerable thermal loading. To remove heat from the light baffle 30, it can be cooled using a number of mechanisms, including heat sinks or forced-air cooling. In a preferred embodiment, the light baffle 30 includes a provision for using a liquid coolant for drawing heat away from light baffle 30 as shown in FIG. 8. An input port 46 and an output port 48 are provided to enable the light baffle 30 to be connected to a liquid cooling system which circulates cooled water or some other coolant fluid. The liquid coolant is circulated into the input port 46, through a U-shaped fluid conduit formed in the base of the light baffle behind the light-trapping surface 54, and out of the output port 48. Heat is transferred from the light baffle 30 to the liquid coolant, thus keeping the light baffle at a cooled temperature. In some embodiments, a thermostat may be used to control the fluid flow in order to maintain a specific temperature. In other embodiments, the fluid flow can be maintained at a constant rate to keep the temperature as low as possible.

The invention has been described in detail with particular reference to certain preferred embodiments thereof, but it will be understood that variations and modifications can be effected within the spirit and scope of the invention. For example, while lasers are described as light sources within each color channel, light-emitting diodes (LEDs) or other light sources could alternately be used.

Thus, what is provided is an improved apparatus and method for absorbing unused off-state light that is discarded from the light modulators, and the accompanying heat that is generated by light absorption

PARTS LIST

10 Projector apparatus
12r, 12g, 12b Light source
18 Illumination beam
22 Modulated light
23 Dump light
30 Light baffle
32 Fin
34 Notch
35 Notch area
36 Knife edge
37 Side
38 Beveled end
40r, 40g, 40b Light modulation assembly
42 Channel
44 Rounded bottom
45 Beveled bottom
46 Input port
48 Output port
50 Lens
51 Integrator
54 Light-trapping surface
60 Spatial light modulator
64 First tilt position
65 Second tilt position
66 Micro-mirror
67 Deflection plane
68 Dichroic surface
70 Projection optics
82 Dichroic combiner
84 Dichroic surface
E1 Enlarged section
L Lengthwise direction
O Optical axis
Q Arced path
R1, R2, R3, R4 Light ray
$t_c$ Channel width
$t_f$ Fin thickness
$\theta_F$ Fin angle
$\theta_F$ Slope angle

The invention claimed is:

1. A light modulation assembly for a digital projection apparatus comprising:
   a solid-state light source that provides an illumination beam;
   a spatial light modulator disposed in the path of the illumination beam, the spatial light modulator having a plurality of tiltable micro-mirrors, each micro-mirror being actuable to tilt with respect to a tilt axis between a first tilt position that provides on-state light and a second tilt position that provides off-state light, wherein the micro-mirrors deflect the illumination beam along an optical axis to provide the on-state light when they are at the first tilt position, and the micro-mirrors deflect the illumination beam away from the optical axis to provide the off-state light when they are at the second tilt position, and wherein the micro-mirrors deflect the illumination beam along an arced path defining a deflection plane as they are tilted between the first tilt position and the second tilt position; and
   a light baffle disposed alongside the optical axis and in the path of the off-state light from the micro-mirrors, the light baffle having a light-trapping surface adapted to absorb the off-state light from the micro-mirrors on the spatial light modulator, the light-trapping surface having a plurality of channels extending in a lengthwise direction, wherein each channel is defined by protruding fins that extend outward from the light-trapping surface at an oblique fin angle with respect to the deflection plane, the lengthwise direction of the channels being substantially parallel to the deflection plane.

2. The light modulation assembly of claim 1 wherein the protruding fins are oriented at a fin angle of less than 60 degrees relative to the deflection plane.

3. The light modulation assembly of claim 1 wherein the protruding fins are shaped and oriented such that the off-state light undergoes at least 2 reflections before exiting the light-trapping surface.

4. The light modulation assembly of claim 1 wherein the fins are tapered to a knife edge.

5. The light modulation assembly of claim 4 wherein the fins have two side surfaces, and wherein at least one of the side surfaces is beveled.

6. The light modulation assembly of claim 1 wherein the channels have rounded bottoms.

7. The light modulation assembly of claim 1 wherein the channels have beveled bottoms.

8. The light modulation assembly of claim 1 wherein the light-trapping surface is oriented at an oblique slope angle with respect to the deflection plane.

9. The light modulation assembly of claim 8 wherein the fin angle and the slope angle are selected together with a channel width and a fin shape including a fin thickness such that substantially all of the off-state light undergoes at least 2 reflections before exiting the light-trapping surface.

10. The light modulation assembly of claim 1 wherein the light baffle is made using a light absorbing material.

11. The light modulation assembly of claim 1 wherein the light-trapping surface is coated with a light absorbing material.

12. The light modulation assembly of claim 1 wherein the light-trapping surface is treated such that it is light absorbing.

13. The light modulation assembly of claim 1 wherein the light baffle is notched to prevent interference between the light baffle and the on-state light from the micro-mirrors on the spatial light modulator.

14. The light modulation assembly of claim 1 wherein the light baffle includes a fluid conduit located behind the light-trapping surface through which cooling fluid is circulated in order to remove heat from the light baffle.

15. A digital projection apparatus including one or more light modulation assembly according to claim 1, together with projection optics for projecting the on-state light from the spatial light modulators in the one or more image forming assemblies onto a display surface.

16. The digital projection apparatus of claim 15 wherein the digital projection apparatus is a color projection apparatus adapted to project color digital image data having at least three color channels, and wherein the color projection apparatus includes at least three light modulation assemblies having different color light sources.

* * * * *